United States Patent [19]

Hu

[11] Patent Number: 5,683,152

[45] Date of Patent: Nov. 4, 1997

[54] VEHICLE TURN SPEED CONTROL

[76] Inventor: Hanbin Hu, 2363 Duncan Dr., #18, Fairborne, Ohio 45324

[21] Appl. No.: 648,881

[22] Filed: May 16, 1996

[51] Int. Cl.$^6$ ..................................................... B60T 8/58
[52] U.S. Cl. .................. 303/146; 180/197; 364/426.016; 364/426.029; 303/141
[58] Field of Search ........................... 303/146, 147, 303/139, 140, 141, 124; 180/197, 233; 364/426.01, 426.02, 426.03, 426.016, 424.052, 426.029; 318/799

[56] References Cited

U.S. PATENT DOCUMENTS

| | | | |
|---|---|---|---|
| 4,848,851 | 7/1989 | Kuraoka et al. | 303/124 |
| 5,102,202 | 4/1992 | Breen | 303/7 |
| 5,134,352 | 7/1992 | Matsumoto et al. | 303/146 |
| 5,276,624 | 1/1994 | Ito et al. | 180/282 |
| 5,289,100 | 2/1994 | Joseph | 318/799 |
| 5,383,531 | 1/1995 | Yoshioka et al. | 180/233 |
| 5,407,023 | 4/1995 | Yamashita et al. | 180/197 |

*Primary Examiner*—Douglas C. Butler
*Attorney, Agent, or Firm*—Marshall & Melhorn

[57] ABSTRACT

A vehicle turn speed control and method therefor having an engine control unit which receives input from at least one speed sensor and at least one angle sensor, calculates the vehicle turn radius, calculates the ratio of the vehicle speed divided by the vehicle turn radius, compares the ratio of the vehicle speed divided by the turn radius with a reference value and outputs a signal to a brake motor which is connected to the vehicle brakes and which will apply the brakes when the calculated ratio of vehicle speed to turn radius exceeds the reference ratio of turn speed.

16 Claims, 2 Drawing Sheets

VEHICLE TURN SPEED CONTROL

BACKGROUND OF THE INVENTION

1. Field of the Invention

This invention relates to a vehicle control system. More particularly, the invention relates to a method and apparatus for controlling the turning speed of a vehicle. Most particularly, the present invention relates to a method and apparatus for controlling the turning speed of the vehicle by determining the ratio of the vehicle speed divided by the turn radius, and applying pressure to the brakes of the vehicle to slow the vehicle if said ratio is greater than predetermined design criteria expressed as a reference ratio.

2. Description of the Prior Art

The present invention uses speed sensors and angle sensors in conjunction with an engine control module or engine control unit and a brake motor to apply the vehicle brakes under certain pre-determined conditions. While the various components have been used in various ways in the prior art, there is no combination showing total vehicle turn speed control.

The U.S. Pat. No. 5,407,023 to Yamashita et al., shows the use of angle sensors and wheel speed sensors, together with a controller, in a manner such that the amount of slip of the driving wheels converges on a target value when the amount of slip of the driving wheels exceed a predetermined threshold value. When the vehicle is making a turn, the amounts of slip of the driving wheels is calculated, and the calculated amounts of slip are corrected with correction values for correcting the amounts of slip of the inner and outer driving wheels taking into account the difference between the wheel speed of the inner driving wheel and that of the outer driving wheel during turning.

The U.S. Pat. No. 5,289,100 to Craig L. Joseph shows a propulsion system whereby when a vehicle is making a turn, an inside motor provides an electric current to a D.C. bus to supply additional power to an outside motor. Speed and steering signals operate the electric motors and control the speed of an engine and an alternator which supplies power to the D.C. bus.

The U.S. Pat. No. 5,383,531 to Yoshioka et al. shows a turn control system for a four wheel drive vehicle which includes an accelerating transmission for driving the right and left steerable wheels at a greater average velocity than the right and left non-steerable wheels.

None of the above prior art shows a system which controls the speed of a vehicle based on a comparison of the ratio of the vehicle speed divided by the turn radius with a reference ratio of turn speed. The speed of the vehicle is controlled in turns so that it does not exceed such reference ratio, which is a predetermined design limit supplied by the auto manufacturer. Thus, those skilled in the art continued to search for a satisfactory system to prevent vehicles from being driven around corners at excessive speeds.

SUMMARY OF THE INVENTION

A vehicle turn speed control is provided having an engine control unit or engine control module which receives inputs from at least one speed sensor and at least one angle sensor calculates the vehicle turn radius, calculates the ratio of the vehicle turn radius divided by the vehicle speed, compares the ratio of turn radius divided by vehicle speed with a reference ratio, and outputs a signal to a brake motor which is connected to the vehicle brakes and which will apply the brakes when the limit turn speed is exceeded.

In one embodiment of the invention, the engine control unit and brake motor may be dedicated to the vehicle speed control system of the present invention.

In another embodiment of the present invention, the engine control unit may be the same as found in almost every vehicle equipped with an automatic braking system (ABS). Several inputs will need to be added. One input will be added for a speed sensor. Another input will be added for the turn angle. A third input will be provided to receive the predetermined design values represented by the reference ratio of limit turn speed. One output will be added for controlling a brake motor.

The brake motor may be such as found in any vehicle having an ABS brake control system, or a separate brake motor may be added if the system is used on vehicles without ABS brake systems.

Therefore, it is an object of the present invention to provide a vehicle turn speed control which prevents accidents from occurring during normal driving conditions when the operator of a motor vehicle attempts to go around a corner at a speed faster than the safe speed for which the vehicle was designed to take a particular corner.

Further objects and advantages of this invention will be apparent from the following description and appended claims, reference being made to the accompanying drawings forming a part of the specification, wherein like reference characters designate corresponding parts in the several views.

It is to be understood that the present invention is not limited to its application to the details of construction and arrangement of parts illustrated in the accompanying drawings, since the invention is capable of other embodiments, and of being practiced or carried out within the scope of the claims. Also it is to be understood that the phraseology and terminology employed herein is for the purpose of description, and not of limitation.

DESCRIPTION OF THE PREFERRED EMBODIMENT

Figure 1:
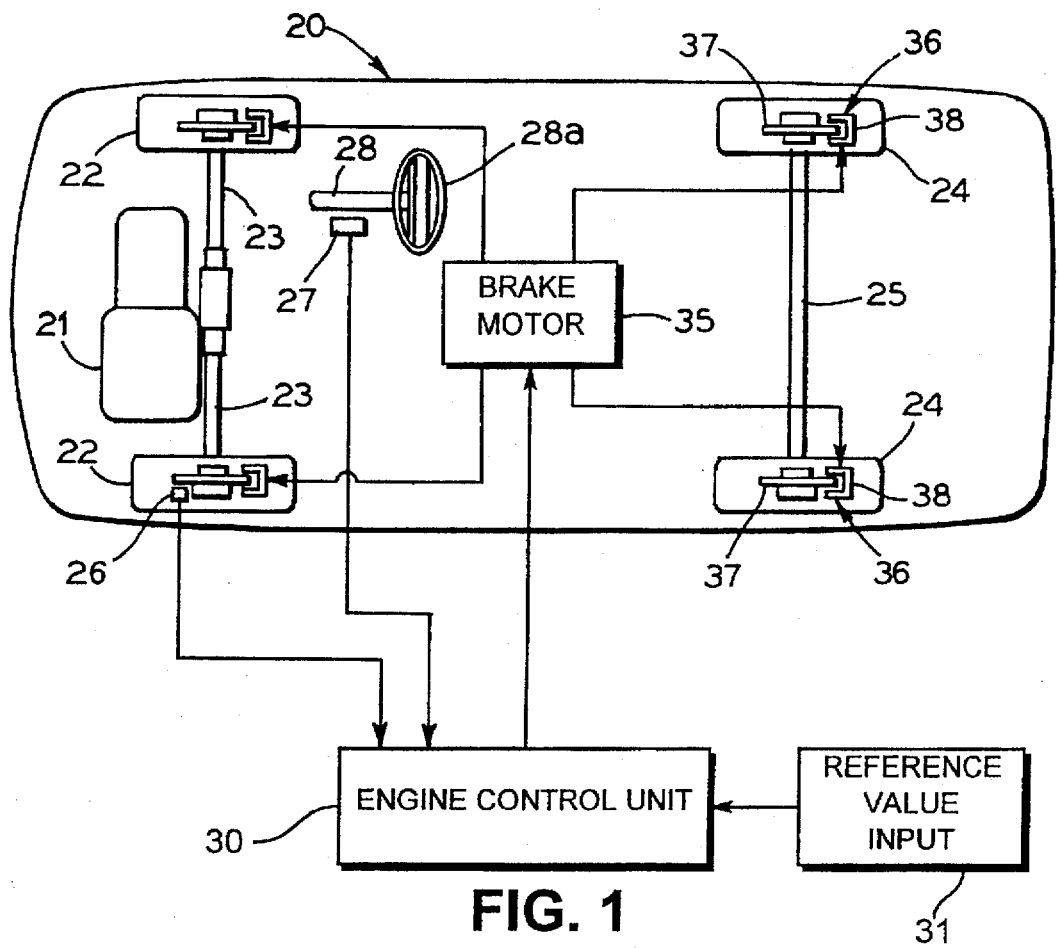
FIG. 1 is a diagrammatic view of a motor vehicle embodying the construction of the present invention.

Referring to FIG. 1 there is shown a motor vehicle, generally designated by the numeral 20, in which the construction of the present invention has been embodied. In the embodiment shown, the motor vehicle 20 is a front drive vehicle having an engine 21 driving the front wheels 22 through two halves of a split drive shaft 23. Rear wheels 24 are mounted for rotation on solid axle 25. Although a front wheel drive motor vehicle is illustrated, it can easily be understood that the present invention may be used with any drive arrangement having any number of driven 22 and non-driven wheels 24.

Regardless of the drive arrangement, the present invention will utilize at least one speed sensor 26, preferably associated with a driven wheel 22, and at least one angle sensor 27. The angle sensor 27 detects the turning angle of the steering wheel 28a as it turns steering shaft 28.

Figure 2:
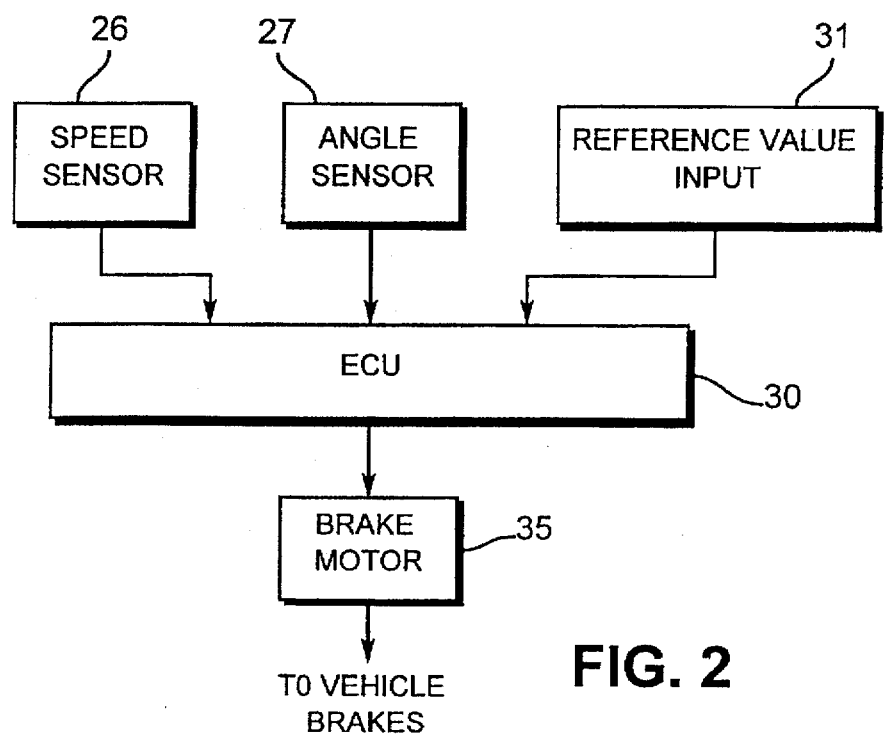
FIG. 2 is a diagrammatic view of a construction embodying the present invention.

Referring now to FIGS. 1 and 2, the signals from the speed sensor 26 and the angle sensor 27 are input to an engine control unit or module 30. The engine control unit or module 30 may be a dedicated module operating only the vehicle turn speed control system of the present invention, or, as found in many vehicles, it may be such as an engine control unit having an engine control section for effecting the fuel injection control and the ignition timing control of a modern internal combustion engine. It is only necessary to add the speed sensor and angle sensor inputs to existing engine control units to adopt them for use in the system of the present invention. It is also necessary to supply an additional input for the design values or reference value input supplied by the motor vehicle manufacturer, to be discussed hereinafter.

As shown in FIG. 2 the engine control unit 30 will supply an output to a brake motor 35 which is hydraulically connected to the well known disc brake systems 36.

Figure 3:
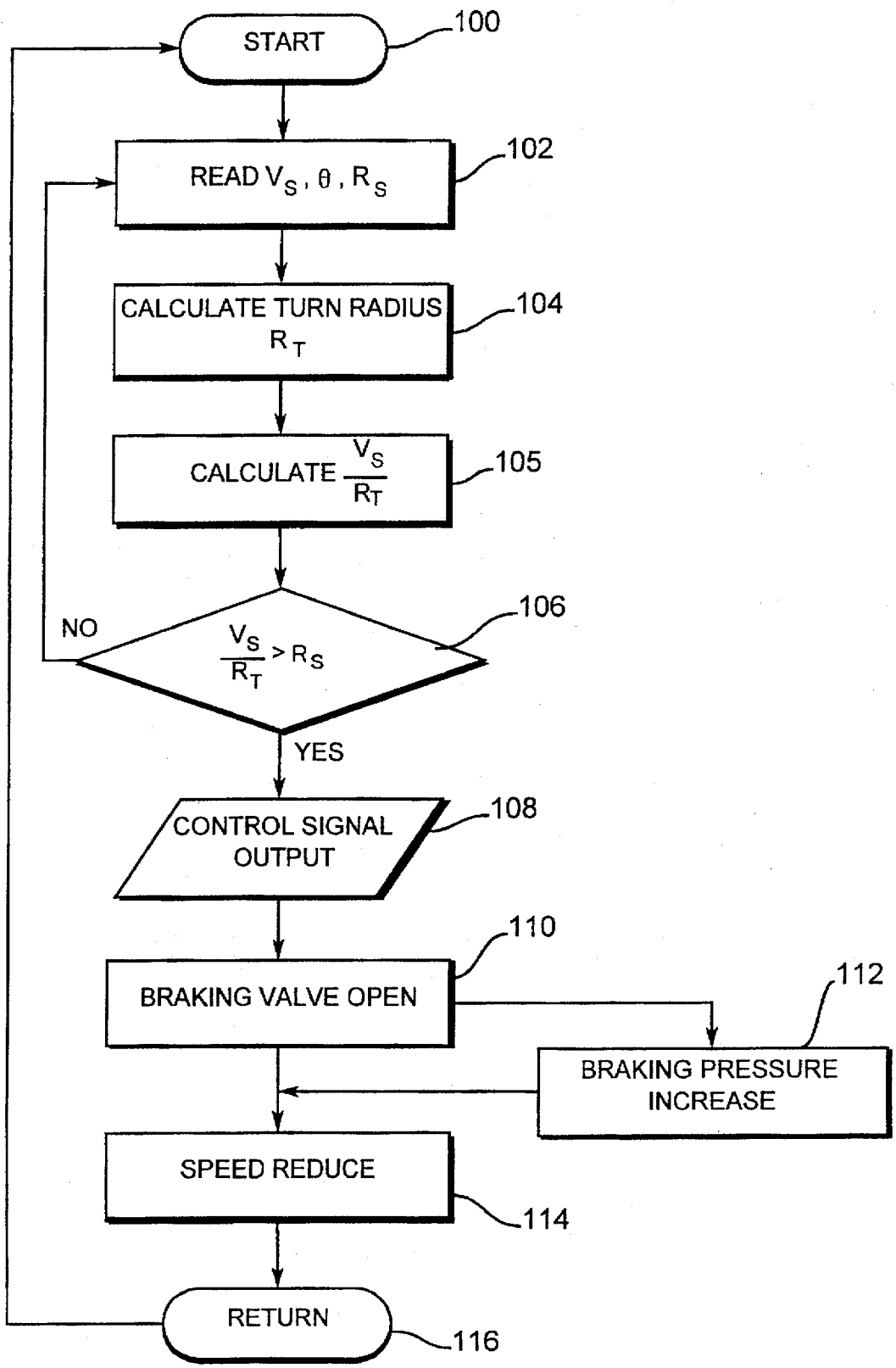
FIG. 3 is a flow chart showing a series of steps according to the method of the present invention.

Referring now to FIG. 3, at the supplying of a suitable start signal by means well known in the art, the system will begin operation (box 100). The system will first read the vehicle speed ($V_s$) from the speed sensor 26, and the turn angle theta |θ| from the turn angle sensor 27. The system also reads the reference ratio of turn speed ($R_s$) 31 supplied for the particular vehicle by the vehicle manufacturer (box 102).

The system will then calculate the turn radius ($R_T$)(box 104) by linear interpolation from the following Table 1. An example of the relationship between the steering angle |θ| and the turn radius ($R_T$) of the vehicle is shown in the following table:

| |θ| | $R_T$ | |
|---|---|---|
| (degree) | (m) | (ft) |
| 15° | 150 | 492 |
| 30° | 85 | 279 |
| 85° | 30 | 98 |
| 175° | 15 | 49 |
| 255° | 10 | 33 |
| 340° | 8 | 26 |
| 425° | 6 | 20 |
| 510° | 5 | 16 |

Next, the system will calculate a ratio based on the vehicle speed divided by the turn radius (box 105) and will compare that value to the reference ratio or limit turn speed (box 106). If the calculated ratio is not greater than the reference ratio, no action will be taken, and the system will loop back to box 102 and begin the loop of reading the values, calculating the turn radius and ratio, and making the comparison. Nothing is done until the ratio of the vehicle speed over the turn radius exceeds the reference ratio.

At this point the system gives a control output signal 108 which opens the brake valve 110 in the brake motor 35 which results in an increase in braking pressure (box 112) which will reduce the speed of the motor vehicle.

When the return (box 116) is reached the system will cycle back to the start at box 100. The vehicle speed will continue to be reduced until the ratio of the vehicle speed divided by the turn radius is no longer greater than the design reference ratio (box 106), at which time the control signal 108 will cease to be supplied to the brake motor 35, and the brake valve will close. This will result in no further pressure being applied by the brake motor 35 through the calipers 38 to the discs 37, and the control of the vehicle again will be with the vehicle operator.

It should be understood that the system is primarily intended for use on dry pavement. In other words, the design reference values give the maximum turn speed for the vehicle for a particular speed on dry pavement. Thus, the system is not intended to operate under wet or snowy conditions when the vehicle speed will be much slower than the speed of operation on dry pavement, and thus the system would not operate unexpectedly in adverse weather conditions. However, the system is particularly advantageous under normal driving conditions on city cross roads, where there are no speed limit signs such as are normally found on curves, to guide the driver as to what a safe speed is. Under these conditions, the system will operate and will prevent turnover accidents which frequently occur by virtue of drivers trying to take corners within the city limits at too great a speed.

Therefore, by carefully analyzing the operation of motor vehicles under turning conditions on a wide variety of road surfaces a novel vehicle turn speed control has been developed.

What is claimed is:

1. A vehicle turn speed control system including:
   a) means for determining the speed of the vehicle;
   b) means for determining the turning angle of the vehicle;
   c) means for determining the turning radius of the vehicle;
   d) means for comparing the ratio of the vehicle speed divided by the turn radius with a reference speed, and
   e) means to apply pressure to the brakes if the ratio of the vehicle speed divided by the turn radius is greater than the reference speed.

2. The system defined in claim 1, wherein the means for determining the speed of the vehicle include a speed sensor.

3. The system defined in claim 2, wherein the means for determining the turning angle of the vehicle include an angle sensor.

4. The system defined in claim 3, wherein the means for determining the turning radius of the vehicle include an engine control unit connected to said angle sensor and said vehicle speed sensor.

5. The device defined in claim 4, wherein the means for comparing the ratio of the vehicle speed divided by the turn radius with a reference speed includes a reference value input connected to said engine control unit.

6. The device defined in claim 5, wherein said means to apply pressure to the brakes include a brake motor connected to said engine control unit.

7. The device defined in claim 6, wherein said means to apply pressure to the brakes further includes a disc brake system.

8. A motor vehicle including a vehicle turn speed control system, said motor vehicle including:
   a) a disc brake system to slow and/or stop said motor vehicle;
   b) a brake motor connected to said disc brake system to operate said disc brake system to stop said motor vehicle when desired;
   c) a steering system including a steering wheel and a steering shaft to steer said motor vehicle;
   d) a steering angle sensor mounted adjacent said steering wheel shaft to supply a signal related to the turning angle of said motor vehicle;
   e) a speed sensor for determining the speed of a wheel of said motor vehicle, said speed sensor mounted adjacent to a wheel of said motor vehicle to supply a signal related to the speed of said motor vehicle;
   f) an engine control unit connected to said brake motor, to said steering angle sensor, and to said speed sensor said engine control unit supplying a signal indicating the ratio of the vehicle speed divided by the turn radius; and g) a reference value input included in said engine control unit, said engine control unit comparing said ratio of the vehicle speed divided by the turn radius and applying the brakes of said vehicle through said brake motor if said ratio is greater than said reference value.

9. A vehicle turn speed control system including:

a) an engine control unit to calculate a ratio of vehicle speed divided by the turn radius of said vehicle;

b) a speed sensor connected to said engine control unit to supply a signal related to vehicle speed;

c) an angle sensor connected to said engine control unit to supply a signal related to the turn radius of said vehicle;

d) a reference value input connected to said engine control unit said reference value input representing the maximum ratio of the vehicle speed divided by the turn ratio permitted for a particular vehicle at any given speed; and e) a brake motor connected to said engine control unit to be operated by said engine control unit to apply a vehicle's brakes if the ratio of the vehicle speed divided by the turn radius is greater than said reference value input.

10. A method for controlling the turn speed of a vehicle, said method including the steps of:

a) determining the speed of the vehicle;

b) determining the turning angle of the vehicle;

c) calculating the turning radius of the vehicle;

d) calculating the ratio of the vehicle speed divided by the turn radius;

e) comparing said ratio with a predetermining design criteria; and f) applying pressure to the brakes of the vehicle to slow the vehicle if said ratio is greater than said predetermined design criteria.

11. The method defined in claim 10, wherein the step of determining the speed of the vehicle includes the steps of:

a) reading said speed sensor;

b) supplying the input from said speed sensor to said engine control unit; and c) utilizing said engine control unit to determine the speed of the vehicle.

12. The method defined in claim 11, wherein the step of determining the turning angle of the vehicle includes the steps of:

a) reading said angle sensor;

b) supplying an input representing the value of the turn angle sensor to an engine control unit; and c) utilizing an engine control unit to determine the turn angle of the vehicle.

13. The method defined in claim 12, wherein the step of calculating the turning radius of the vehicle includes the steps of:

a) reading said angle sensor to determine the value of the steering angle;

b) calculating said turn radius by linear interpolation utilizing the values shown in the following table:

| $|\theta|$ | $R_T$ | |
| --- | --- | --- |
| (degree) | (m) | (ft) |
| 15° | 150 | 492 |
| 30° | 85 | 279 |
| 85° | 30 | 98 |
| 175° | 15 | 49 |
| 255° | 10 | 33 |
| 340° | 8 | 26 |
| 425° | 6 | 20 |
| 510° | 5 | 16 |

14. The method defined in claim 13, wherein the step of calculating the ratio of the vehicle speed divided by the turn radius includes the steps of:

a) reading said turn radius;

b) reading said speed of the vehicle;

c) calculating said vehicle speed ratio from the vehicle speed divided by the turn radius.

15. The method defined in claim 14, wherein the step of comparing said ratio with a previously determined design criteria includes the steps of:

a) supplying a reference value input to an engine control unit;

b) comparing said ratio with said reference value input; and c) supplying an output signal to a brake motor if said ratio exceeds said predetermined design criteria.

16. The method defined in claim 15, wherein the step of applying pressure to the brakes of the vehicle includes the step of:

a) utilizing said brake motor to supply increased brake fluid pressure through a hydraulic line to the brakes of a motor vehicle.

* * * * *